US012511167B2

(12) United States Patent
Deng

(10) Patent No.: US 12,511,167 B2
(45) Date of Patent: Dec. 30, 2025

(54) METHODS AND SYSTEMS FOR BALANCING LOADS IN DISTRIBUTED COMPUTER NETWORKS FOR COMPUTER PROCESSING REQUESTS WITH VARIABLE RULE SETS AND DYNAMIC PROCESSING LOADS

(71) Applicant: THE BANK OF NEW YORK MELLON, New York, NY (US)

(72) Inventor: Qun Deng, New York, NY (US)

(73) Assignee: THE BANK OF NEW YORK MELLON, New York, NY (US)

(*) Notice: Subject to any disclaimer, the term of this patent is extended or adjusted under 35 U.S.C. 154(b) by 126 days.

(21) Appl. No.: 18/318,954

(22) Filed: May 17, 2023

(65) Prior Publication Data

US 2023/0289235 A1 Sep. 14, 2023

Related U.S. Application Data

(60) Division of application No. 17/563,577, filed on Dec. 28, 2021, now Pat. No. 11,693,709, which is a continuation of application No. 16/995,601, filed on Aug. 17, 2020, now Pat. No. 11,263,055.

(51) Int. Cl.
G06Q 30/00 (2023.01)
G06F 9/50 (2006.01)
G06Q 40/06 (2012.01)

(52) U.S. Cl.
CPC ............ *G06F 9/505* (2013.01); *G06F 9/5072* (2013.01); *G06F 9/5077* (2013.01); *G06Q 40/06* (2013.01); *G06F 2209/508* (2013.01)

(58) Field of Classification Search
CPC ........................................................ G06F 9/50
USPC ......... 705/39, 1.1, 38, 37, 36 R; 718/1, 105; 709/224, 201
See application file for complete search history.

(56) References Cited

U.S. PATENT DOCUMENTS

| 2010/0058349 | A1 | 3/2010 | Diwakar |
| 2011/0072437 | A1 | 3/2011 | Druyan |
| 2015/0032591 | A1* | 1/2015 | Jacob ............... G06Q 40/04 705/37 |
| 2019/0050245 | A1 | 2/2019 | Bhageria |
| 2019/0377724 | A1* | 12/2019 | Pennington ......... G06Q 20/02 |
| 2022/0051320 | A1 | 2/2022 | Chaubal |

OTHER PUBLICATIONS

ProQuestDialogNPL Search History.*
IP.Com NPL Search History.*

* cited by examiner

*Primary Examiner* — John H. Holly
(74) *Attorney, Agent, or Firm* — Pillsbury Winthrop Shaw Pittman, LLP

(57) ABSTRACT

Methods and systems are described for balancing loads in distributed computer networks for computer processing requests with variable rule sets and dynamic processing loads. The methods and systems may include determining an initial allocation of the plurality of processing requests to the plurality of available domains that has a lowest initial sum excess processing load. The methods and systems may then retrieve an updated estimated processing load for at least one of the plurality of processing requests and determine a secondary allocation of the plurality of processing requests to the plurality of available domains.

20 Claims, 5 Drawing Sheets

METHODS AND SYSTEMS FOR BALANCING LOADS IN DISTRIBUTED COMPUTER NETWORKS FOR COMPUTER PROCESSING REQUESTS WITH VARIABLE RULE SETS AND DYNAMIC PROCESSING LOADS

CROSS-REFERENCE TO RELATED APPLICATIONS

The present application is a Divisional Application of U.S. patent application Ser. No. 17/563,577, filed Dec. 28, 2021, which is a Continuation Application of U.S. patent application Ser. No. 16/995,601, filed 17 Aug. 2020, the entire contents of each of which is incorporated herein by reference.

FIELD OF THE INVENTION

The invention relates to balancing loads in distributed computer networks for computer processing requests with variable rule sets and dynamic processing loads. For example, the invention may relate to continuous resource allocation optimization with dynamic constraints and transition cost for re-balancing and may have application in collateral portfolio optimization or cloud resource management.

BACKGROUND

Information and data storage systems are growing increasingly complex. Computer systems are no longer limited to individual domains and instead may span numerous domains across computer networks, the Internet, or operating systems. Moreover, processing requests may be assigned to different domains and these assignments may require balancing of loads. As systems become more robust, and the number of variables related to processing requests increases, efficiently balancing the load on a system caused by these processing requests exponentially increases as well.

SUMMARY

Methods and systems are described herein for balancing loads in distributed computer networks for computer processing requests with variable rule sets and dynamic processing loads. For example, conventional systems may allocate one or more processing requests to one or more domains based on an expected time and/or processing power (e.g., estimated processing load) required to handle the request. Following this initial allocation, however, the actual time and/or processing power (e.g., actual processing load) for a give request may change. That is, when thousands of processing requests are being allocated and/or handled in parallel, any difference in the estimated processing load and actual processing load may create inefficiencies in the system. However, simply reallocating pending and/or queued processing requests according to the actual processing load also results in inefficiencies as there may be an additional processing load for each reallocation of the plurality of processing requests. For example, when transitioning one processing request from one domain to another, there may be an additional burden on the system as individual processing requests may not be able to be seamlessly transitioned.

Accordingly, the methods and systems describe balancing loads by reallocating processing requests, not only based on changes to processing load estimates, but also the additional processing loads that reallocations create. However, once this additional criteria for reallocation is introduced, another problem arises. Specifically, the complexity of the reallocation problem. For example, in many cases, individual domains may have rule sets (e.g., constraints) specific to those domains. These individual rule sets and their effect of the overall system must be considered. Accordingly, to efficiently reallocate, the system must consider numerous variables with exponentially increasing processing requests, domains, and status changes all in a model that can processes the variables quickly enough to increase efficiency.

To achieve this, the system relies on mixed integer programming models which mandate that objective functions and all constraints are linear functions and variables are either in integer space (allocation variables cannot be fractional of shares) or in continuous space. Notably, this results in a complexity class of the decision problems of NP-complete (meaning there is no polynomial-time algorithm), which may be efficiently processed. For example, by maintaining a first group of constraints related to excess processing load and dropping other constraints, the model complexity becomes equivalent to a knapsack decision problem (which has NP-complete complexity). Due to this, the typical integer variable size handled by the system may vary from 500,000 to 10,000,000 (Cartesian product between number of domains and number of eligible processing requests), which is unattainable by system and models based on Branch-and-Bound or Branch-and-Cut algorithms. More specifically, the system may employ a column generation algorithm, which can solve very large mixed integer programming models (e.g., up to 15,000,000 variables) in under 10 minutes.

In one aspect, systems and methods are described for balance loads in distributed computer networks for computer processing requests with variable rule sets and dynamic processing loads. For example, the system may retrieve a plurality of available domains. The system may retrieve a plurality of processing requests, wherein each respective processing request has an initial estimated processing load. The system may monitor a respective excess processing load for each of the plurality of available domains, wherein the respective excess processing load comprises an amount of processing load availability on a domain of the plurality of available domains. The system may determine an initial allocation of the plurality of processing requests to the plurality of available domains that has a lowest initial sum excess processing load, wherein the initial allocation comprises assigning each of the plurality of processing requests to a respective available domain of the plurality of available domains based on the initial estimated processing load for each of the plurality of processing requests, and wherein the initial sum excess processing load comprises a summation of the respective excess processing load for each of the plurality of available domains based on the initial estimated processing load for each of the plurality of processing requests. The system may allocate the plurality of processing requests to the plurality of available domains based on the initial allocation. The system may retrieve respective domain rule sets for each of the plurality of available domains. The system may retrieve an updated estimated processing load for at least one of the plurality of processing requests. The system may determine a secondary allocation of the plurality of processing requests to the plurality of available domains, wherein the secondary allocation comprises assigning each of the plurality of processing requests to a respective available domain of the plurality of available domains based on the updated estimated processing load and the respective domain rule sets, and wherein a secondary sum excess processing load comprises a summation of the respective excess processing load for each of the plurality of available domains based on the updated estimated processing load for each of the plurality of processing requests; determining an additional processing load for each reallocation of the plurality of processing requests due to the secondary allocation. The system may determine a composite sum excess processing load, wherein the composite sum excess processing load comprises a sum of the secondary sum excess processing load and the additional processing load for each reallocation of the plurality of processing requests due to secondary allocation. The system may determine that the composite sum excess processing load is lower than the lowest initial sum excess processing load; and in response to determining that a composite sum excess processing load is lower than the lowest initial sum excess processing load, reallocating the plurality of processing requests to the plurality of available domains based on the secondary allocation.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

Figure 1:
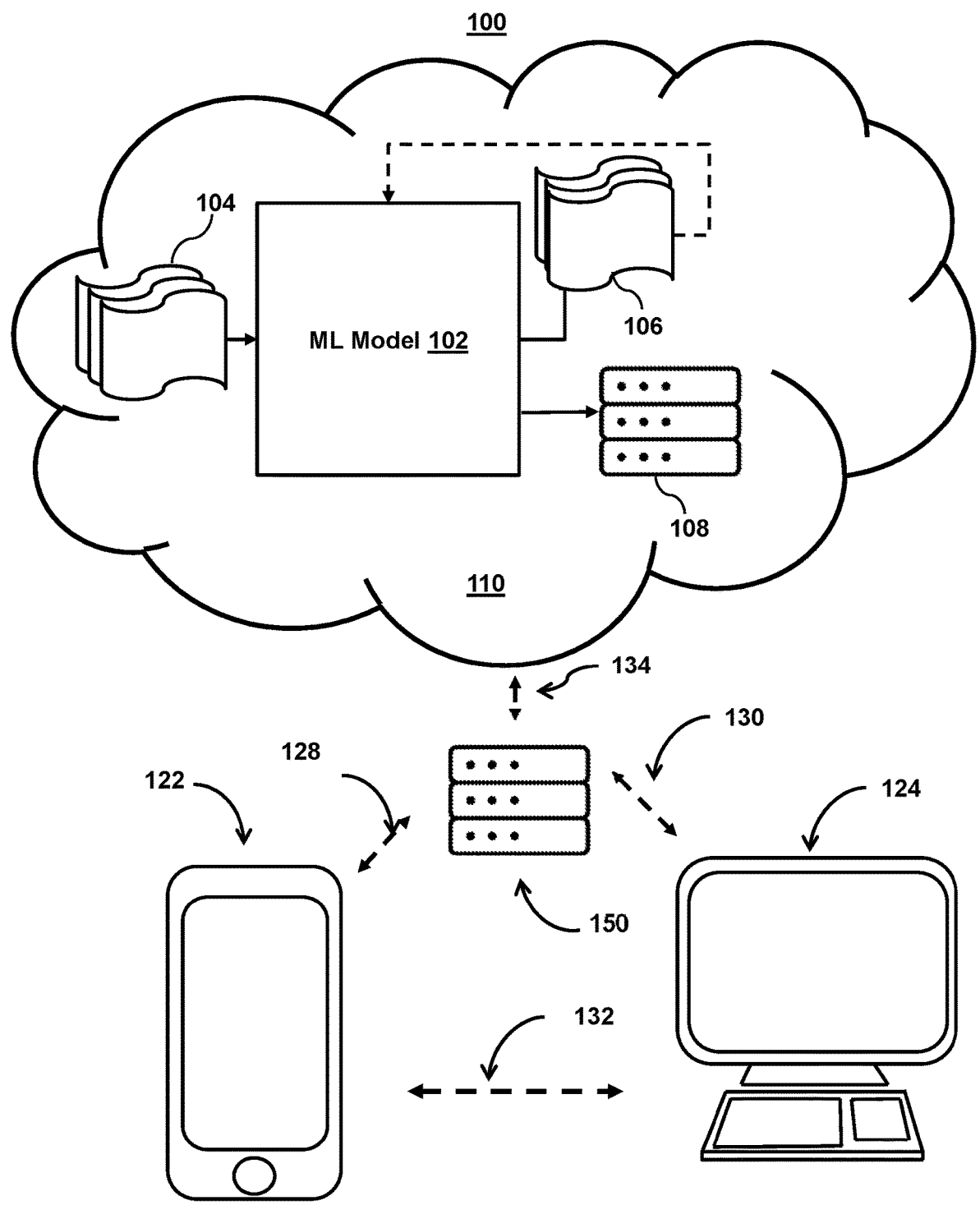
FIG. 1 shows an illustrative system for balancing loads in distributed computer networks for computer processing requests with variable rule sets and dynamic processing loads.

FIG. 1 shows an illustrative system for balancing loads in distributed computer networks for computer processing requests with variable rule sets and dynamic processing loads. As shown in FIG. 1, system 100 may include user device 122, user device 124, and/or other components. Each user device may include any type of mobile terminal, fixed terminal, or other device. Each of these devices may receive content and data via input/output (hereinafter "I/O") paths and may also include processors and/or control circuitry to send and receive commands, requests, and other suitable data using the I/O paths. The control circuitry may be comprised of any suitable processing circuitry. Each of these devices may also include a user input interface and/or display for use in receiving and displaying data.

Users may, for instance, utilize one or more of the user devices to interact with one another, one or more servers, or other components of system 100. It should be noted that, while one or more operations are described herein as being performed by particular components of system 100, those operations may, in some embodiments, be performed by other components of system 100. As an example, while one or more operations are described herein as being performed by components of user device 122, those operations may, in some embodiments, be performed by components of user device 124. System 100 also include cloud-based components 110, which may have services implemented on user device 122 and user device 124, or be accessible by communication paths 128, 130, 132, and 134, respectively. System may then balance loads between servers (e.g., servers 108). It should also be noted that the cloud-based components in FIG. 1 may alternatively and/or additionally be non-cloud-based components. Additionally or alternatively, one or more components may be combined, replaced, and/or alternated. For example, system 100 may include database 104, 106, and 108, which may provide data to server 102.

System 100 may also include a specialized network balancer (e.g., balancer 150), which may act as a network gateway, router, and/or switches. Balances 150 may additionally or alternatively include one or more components of cloud-based components 110 for balancing loads among domains (e.g., server 108). Balancer 150 may comprise networking hardware used in telecommunications for telecommunications networks that allows data to flow from one discrete domain to another. Balancer 150 may use more than one protocol to connect a multiple networks and/or domain (as opposed to routers or switches) and may operate at any of the seven layers of the open systems interconnection model (OSI). It should also be noted that the functions and/or features of balancer 150 may be incorporated into one or more other components of system 100, and the functions and/or features of system 100 may be incorporated into balancer 150.

In some embodiments, system 100 may include cloud-based storage circuitry configured to store a list of a plurality of available domains and respective domain rule sets for each of the plurality of available domains. It should be noted that as referred to herein, a domain may include a computer domain, a file domain, an internet domain, network domain, or windows domain. It should also be noted that a domain may comprise, in some embodiments, other material or immaterial objects such as an account, collateral items, warehouses, etc. For example, a domain may comprise any division and/or distinction between one or more products or services. For example, in some embodiments, a domain may comprise, or correlate to a financial service or deal. Accordingly, the rules set for each domain may include rules, characteristics, requirements, etc. that correspond to the domain. For example, if the domain corresponds to a financial service, contract, or other deal, the rule set may comprise terms related to the service, contract, or deal.

In some embodiments, system 100 may include cloud-based storage circuitry. The circuitry may be configured to retrieve a plurality of available domains, retrieve a plurality of processing requests, wherein each respective processing request has an initial estimated processing load, and monitor a respective excess processing load for each of the plurality of available domains, wherein the respective excess processing load comprises an amount of processing load availability on a domain of the plurality of available domains. In some embodiments, the plurality of processing requests may correspond to processing functions for applications or programs that need to be performed (e.g., in a client-server arrangement). For example, each processing request may comprise a request, by a client device, to use the functions (e.g., processing power and/or resources) of a domain (e.g., a server). The system may then balance the load that the plurality of processing requests comprises between the various available domains. In such cases the respective excess processing load may comprise an amount of processing load availability on a domain of the plurality of available domains that remains after one or more processing requests have been assigned to a given domain and/or the plurality of available domains as a whole. The system may continuously and/or periodically monitor (e.g., via queries to individual domains) the changes to the processing loads and excesses thereof.

In some embodiments, the processing requests may correspond to comprise other divisions and/or distinctions between one or more products or services that need to be assigned to a given domain. For example, in some embodiments, where a domain comprises, or correlates to a financial service or deal, the processing requests may comprise one or more material or immaterial products or services that need to be assigned to the domain. For example, the processing request may comprise collateral items (or electronic designations of collateral items) that need to be assigned to one or more deals. In such cases, the excess processing load may comprise an amount of (e.g., in terms of monetary value) shortfall or difference in the value of the collateral items and the value required by the deal. For example, the excess processing load may comprise the uncollateralized portion comprises an amount of shortfall of a price of the collateral on a deal of the plurality of available deals. In another example, processing requests may correspond to a cost to carry for each of the plurality of available deals, wherein the respective cost to carry comprises a sum price of collateral items on a deal of the plurality of available deal. Additionally or alternatively, the initial estimated processing load for each of the plurality of processing requests may comprise a price (e.g., monetary value) of a given collateral item, collateral par in dealer box, a market value, rating, or rule. The system may also detect changes in the processing load in response to price changes, collateral par in dealer box being reduced, market value or rating changes that triggered concentration limit breach, or rule changes triggered eligibility breach, etc. The system may continuously and/or periodically monitor (e.g., via queries to one or more internal and/or third-party sources) the changes to the processing loads and excesses thereof.

For example, in some embodiments, methods and systems are described herein for allocating heterogeneous products (e.g. collaterals or cloud storage, these products are not infinitely divisible) to heterogeneous requestors (e.g. repo investors or cloud users) subject to a set of rules and dynamic constraints based on plural states of requestors' accounts, the objective is to provide optimal solution which satisfy all requestors' demand and comply with associated rules while minimizing a cost function which incorporating both resource carry cost and transition cost for re-balancing.

In some embodiments, the system may aggregate the excess processing load and/or processing loads in order to balance the loads across the system. The system may sum the various components to determine an aggregate value of a given variable (e.g., excess processing load) across the system. The system may further apply one or more functions (e.g., as described in FIGS. 2-3 below) to minimize one or more variables.

For example, conventional resource allocation systems may try to optimize a carry cost function by re-balancing certain resources purely based on carry cost savings subject to static rules, it might become suboptimal if transition process is incorporated into decision process, it can also produce infeasible solutions in some cases as plural state of requestor restrict such re-balancing. This is evident in collateral management systems when some accounts do not accept credit or mandate over collateralization before re-balancing happens, this calls for using "swing position" (position swing in and then swing out after transition, swing position usually has high carry cost to be used by requestor) to help resource transitioned. Given that re-balancing cost (e.g. cost associated with using swing position) can be intangible, we pioneered in using transition cost addon in the objective cost function to ensure optimal allocation solution produced by the system can be transitioned seamlessly.

Accordingly, the methods and systems describe balancing resource allocations by re-processing requests, not only based on changes to processing load estimates, but also the additional processing loads that reallocations create. However, once this additional criteria for reallocation is introduced, another problem arises. Specifically, the complexity of the reallocation problem. For example, in many cases, individual requestors may have rule sets (e.g., constraints) specific to those requestors. These individual rule sets and their effect on the overall system must be considered. Accordingly, to efficiently reallocate, the system must consider numerous variables with exponentially increasing processing requests, requestors, and status changes all in a model that can processes the variables quickly enough to increase efficiency.

Each of these devices may also include memory in the form of electronic storage. The electronic storage may include non-transitory storage media that electronically stores information. The electronic storage of media may include (i) system storage that is provided integrally (e.g., substantially non-removable) with servers or client devices and/or (ii) removable storage that is removably connectable to the servers or client devices via, for example, a port (e.g., a USB port, a firewire port, etc.) or a drive (e.g., a disk drive, etc.). The electronic storages may include optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

FIG. 1 also includes communication paths 128, 130, and 132. Communication paths 128, 130, and 132 may include the Internet, a mobile phone network, a mobile voice or data network (e.g., a 4G or LTE network), a cable network, a public switched telephone network, or other types of communications network or combinations of communications networks. Communication paths 128, 130, and 132 may include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Figure 2:
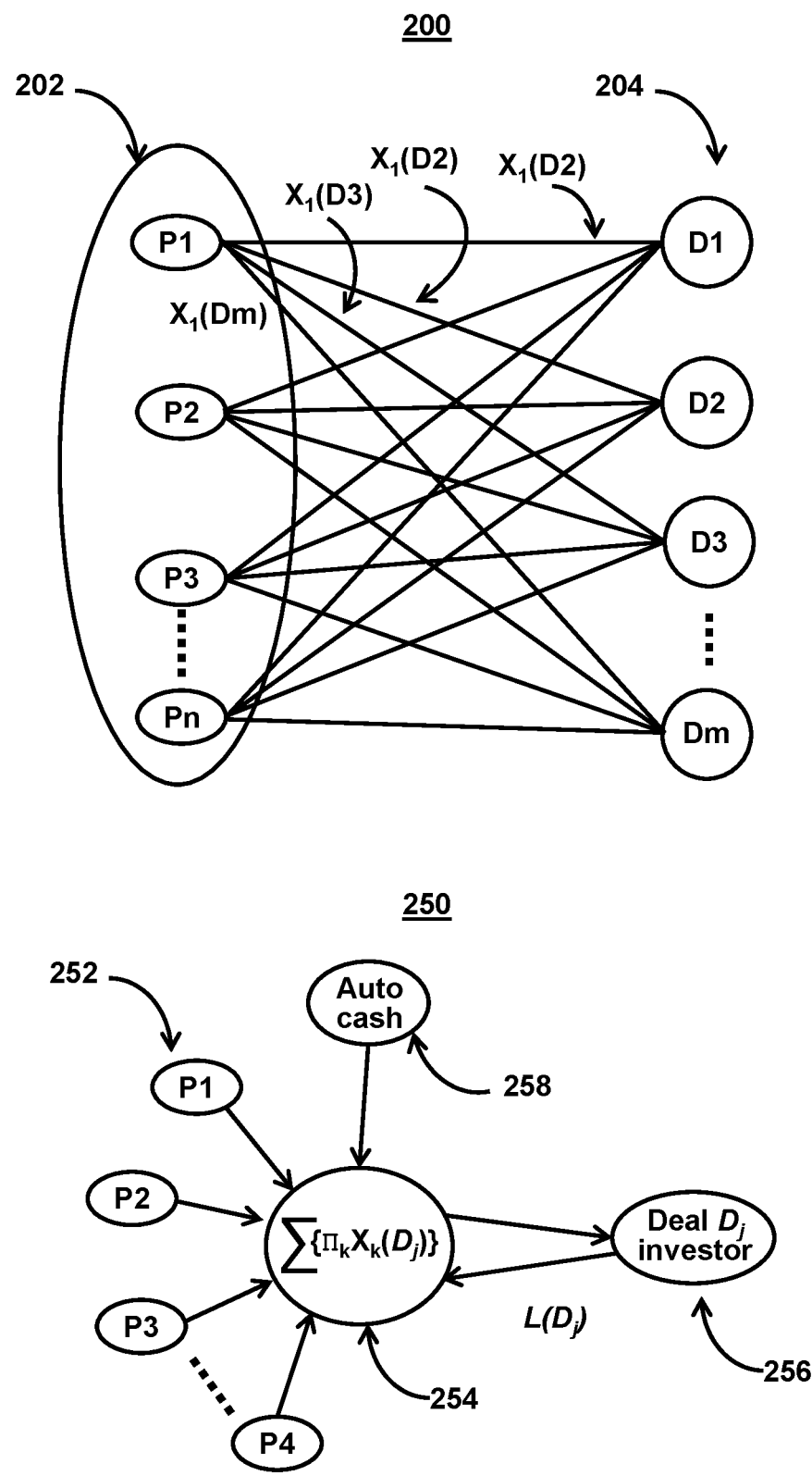
FIG. 2 shows an illustrative system diagram for implementing an initial allocation, in accordance with one or more embodiments.
Figure 3:
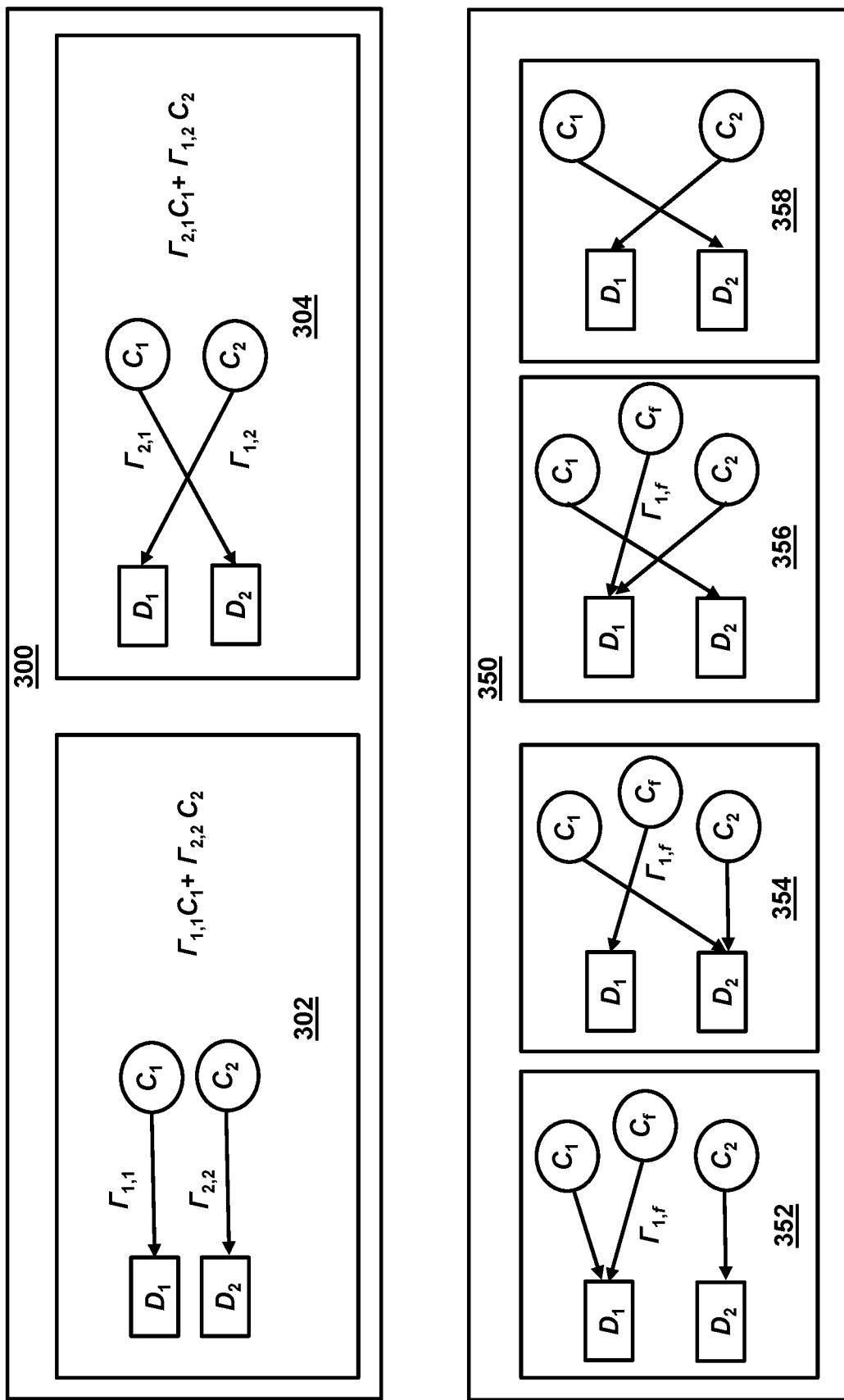
FIG. 3 shows an illustrative system diagram for implementing a secondary allocation, in accordance with one or more embodiments.

FIGS. 2-3 show illustrative system diagrams for balancing loads in distributed computer networks for computer processing requests with variable rule sets and dynamic processing loads. In particular, FIGS. 2-3 describe an example in a financial services context. However, the system structure and algorithms discussed below may alternatively be applied to other applications. For example, load balancing in distributed computer networks to manufacturing and production applications. For example, mixed integer programming models are widely used in logistics and warehouse management, supply chain management, etc., and the improvements described herein are equally applicable to those application. For example, a company may need to build/maintain/expand geographically distributed warehouses, which store merchandise to serve custom purchases. In such cases, a domain may comprise physical warehouses and the processing requests may comprise merchandise. The excess processing load may correspond to a holding cost and the additional processing load for each reallocation may correspond to the cost to move the merchandise between warehouses. In such cases, the system may generate a model with the objective of minimizing overall warehouse management cost. The decision variable in such cases becomes quantity of each merchandise to be allocated to a particular warehouse subject to warehouse capacity constraints, merchandise limits, custom demands around each warehouse and revenue generation targets, etc. Notably, in such applications the typical size of decision variables for warehouse management is larger compared to computer domains such that it can easily surpass the capabilities of traditional systems.

FIG. 2 shows an illustrative system diagram for implementing an initial allocation, in accordance with one or more embodiments. For example, FIG. 2 shows diagram 200 and 250, which relate to generating an initial allocation as discussed in FIG. 4 below. For example, diagram 200 illustrates plurality of available processing requests 202, which may be allocated to domains 204. In a financial services embodiment, plurality of available processing requests 202 may comprise available collateral items that may be assigned to a plurality of deals (e.g., domains 204). For example, the system may comprise a computer system for allocation collateral for one or more repurchase agreements ("repos"). A repo is a form of short-term borrowing for dealers in government securities. In the case of a repo, a dealer sells government securities to investors, usually on an overnight basis, and buys them back the following day at a slightly higher price. For example, each of the plurality of available processing requests 202 (P) may comprise an individual processing request. The system may assign each of plurality of available processing requests 202 to one or more domain D of domains 204. For example, $\{P_k: k\in[1, n]\}$ may represent collateral items in dealer b's box, $\{D_j: j\in[1, m]\}$. For example, each D may be a repo deal between dealer b and a group of investors. As shown in diagram 252, the system may allocate the collateral according to decision variables $\{X_k(D_j), k\in[1, n], j\in[1, m]\}$, which is par amount of collateral k allocated to deal D so that all deals are collateralized and cash usage is minimized. ($\pi_k$ is the unit price of collateral k; $L(D_j)$ is loan cash value of a deal $D_j$). For example, plurality of available processing requests 252, may be processed by the system at point 254 to allocate collateral to deal 256. Additionally, diagram 250 includes additional processing load 258 (e.g., "corresponding to a cash addition in the financial services embodiment) that is used to balance any shortage of collateral in a given deal.

However, in some embodiments, domains may have specific rule sets that constraint and/or limit the type, amount, and other characteristics of a processing request. For example, in a financial services embodiment, a domain rule set may include a UNCOL tag, which in a repo account mandates that a UNCOL deal is fully collaterized before any collateral can be de-allocated from it. Another domain rule set may be a No Cash repo accounts cannot use cash or credit for collateral movements, other repo accounts are subject to credit usage limit for position movements. Another domain rule set may be a collateral registration change, which may impose tangible transaction costs to reallocation.

Notably, diagram 200 and diagram 250 may correspond to balancing loads in distributed computer networks for computer processing requests with variable rule sets and dynamic processing loads. For example, the system may correspond to a plurality of available domains (e.g., domains 204) and processing a plurality of processing requests (e.g., the plurality of available processing requests 202), wherein each respective processing request has an initial estimated processing load.

FIG. 3 shows an illustrative system diagram for implementing a secondary allocation, in accordance with one or more embodiments. For example, FIG. 3 shows diagrams 300 and 350, which relate to generating an initial allocation as discussed in FIG. 5 below. For example, diagram 300 illustrates a tension between minimizing excess processing load and additional processing load for each reallocation. For example, in a financial services embodiment, diagram 302 and diagram 304 show a cost of carry (e.g., excess processing load) and transition cost (e.g., additional processing load for each reallocation). For example, in diagram 302, $\Gamma_{i,k}$ is cost of carry if collateral $C_k$ is allocated to deal $D_i$. Diagram 304 illustrates cost of carry saving if $\Gamma_{1,1}C_1 + \Gamma_{2,2}C_2 > \Gamma_{2,1}C_1 + \Gamma_{1,2}C_2$ by swapping $C_1$ and $C_2$.

Diagram 350 illustrates further optimization of allocations through diagram 352, 354, 356, and 358. For example, with respect to a financial services embodiment, if deal $D_1$ and $D_2$ are no cash deals, they cannot be left short during transition, there is transition cost for swapping collateral $C_1$ and $C_2$ by borrowing available eligible collateral $C_f$. This cost might be intangible but real, if such cost exceed savings $(\Gamma_{1,1}C_1 + \Gamma_{2,2}C_2) - (\Gamma_{2,1}C_1 + \Gamma_{1,2}C_2)$ then optimization model need take such cost into account. Notably, in some embodiments related to load balancing, deal $D_1$ and $D_2$ may correspond to a plurality of available domains, and collateral $C_1$ and $C_2$ may correspond ta plurality of processing requests In some embodiments, the system may use specific model variables for optimization decisions. For example, the system may separate out reallocations (e.g., collateral item movements in the financial services embodiments) from target allocation par amount in order to apply an additional processing load for each reallocation (e.g., a transition cost in a financial services embodiment). For example, $Y_k(D)$ is integer variable represent new/additional par of position k allocated to deal D.

$Z_k(D)$ is integer variable represent par amount to be de-allocated from D if $$P_k^{(0)}(D) > 0$$

$$X_k(D) = P_k^{(0)}(D) + Y_k(D) - Z_k(D)$$

is target par amount of position k allocated to deal D.

$$\{P_k^{(0)}(D), k \in \mathbb{K} \text{ and } D \in \mathbb{D}_b\}$$

is the start state allocation

Redundant variables $Y_k(D)$ can be removed by introducing following relationship constrains for $Z_k(D)$ if $$P_k^{(0)}(D) > 0$$

in order to keep number of new variables low.

$$X_k(D) + Z_k(D) \geq P_k^{(0)}(D); \quad Z_k(D) \leq P_k^{(0)}(D)$$

An additional processing load for each reallocation (e.g., a transition cost in a financial services embodiment) for variable $Z_k(D)$ may be introduced in objective function as a percentage of excess processing load (e.g., cost of carry) $\Gamma_{k,b,l}$ (e.g., cost of carry for collateral k between borrower b and lender l). The system may do this to reduce collateral movements among No Cash accounts or accounts with tight Credit Limit. For example, the system may determine an initial allocation and reallocation by using a Model Driven Min-Mod and Transition Cost model to improve efficiency of allocation process.

For example, as shown in diagram 350, the system makes a feasible minimal modification (Min-Mod) solution from an initial allocation while satisfying for all related constraints (e.g., domain rule sets). For example, the system may determine that an initial allocation is infeasible due to updates to initial estimated processing load (e.g., in the financial services embodiment, the updates to the processing load may be due to collateral par in dealer box being reduced, market value or rating changes triggering concentration limit breach, or rule changes triggering eligibility breaches, etc.).

For example, in the financial services embodiment, the system may use $$\{P_k^{(mm)}(D), k \in \mathbb{K} \text{ and } D \in \mathbb{D}_b\}$$

is integer variable represent amount of position k to allocate to deal D in Min-Mod solution.

$$\{P_k^{(0)}(D), k \in \mathbb{K} \text{ and } D \in \mathbb{D}_b\}$$

is the initial allocation

L(D) is loan value of a deal $D_{b,l}$ (deal between dealer b and lender l, abbreviated as D).

$M_k(D)$ is margin factor between collateral k and deal D.

$\pi_k$ is the unit price of collateral k.

The system may use linear optimization (with integer variables) for Min-Mod model:

$$\text{Min: } \sum_{D \in \mathbb{D}_{b,l}} \sum_{k \in \mathbb{K}} \{P_k^{(0)}(D) - P_k^{(mm)}(D)\}$$

Subject:

$$\sum_{k \in \mathbb{K}} \frac{\pi_k}{M_k(D)} P_k^{(mm)}(D) + C(D) \geq L(D) \quad \text{for each deal } D \in \mathbb{D}$$

$$\sum_{D_{b,l} \in \mathbb{D}} \{P_k^{(mm)}(D)\} \leq P_{k,b} \quad \text{for each position } k \in \mathbb{K}$$

$$\sum_{k \in \mathbb{K}, D \in \mathbb{D}_{b,l}} \{\pi_k P_k^{(mm)}(D) * I(k, D)\} <= V_{b,l} \quad \text{for each concentration limit}$$

$$P_k^{(mm)}(D) \geq P_k^{(min)} z, z \in \{0, 1\} \quad \text{for k if min par } P_k^{(min)} > 1$$

$$0 \leq P_k^{(mm)}(D) \leq P_k^{(0)}(D) \quad \text{boundary for } P_k^{(mm)}(D)$$

$P_{k,b}$: par amount of collateral k in dealer box b.

$V_{b,l}$: concentration limit in market value (or par amount) defined between dealer b and lender l.

I(k, D): equal to 1 if k and D participate in the concentration constraint, 0 otherwise.

The system may then apply any domain rule sets. For example, in the financial services embodiment, a domain rule set with a UNCOL constraint restricts reallocations (e.g., movements of collateral items) for account with UNCOL and is short in the initial allocation. In case of collateral recall, the system may manually allocate additional collateral and make the domain (e.g., an account comprising the deal) compliant before the collateral is reallocated. In this scenario, the rules set (e.g., UNCOL constraint) for that domain (e.g., account) should not be activated.

In another example, in the financial services embodiment, a domain rule set with a Credit Charge amount A(D) for account D can be used to track collateral releases. If deal D has UNCOL tag, and collateral value plus credit charge is short as following:

$$\sum_{k \in \mathbb{K}} \frac{\pi_k}{M_k(D)} P_k^{(0)}(D) + A(D) < L(D)$$

If the system determines that the deal D is short in initial allocation and no collateral recalls happened the system optimized the allocation, the domain rule set (e.g., UNCOL constraint) should be activated.

$$P_k^{(mm)}(D) \le X_k(D)$$

$X_k(D)$ is integer variable represent optimal allocation of position k to deal D.

During reallocation, the system may then minimize the amount short. For example, in the financial services embodiment, the system may minimize Amount Short while maintaining min-mod allocation for accounts with UNCOL tag if they were short in the initial allocation. Given $X_k(D) \ge 0$ is integer variable represent allocation of position k to deal D, $C(D) \ge 0$ is continuous variable represent cash usage for deal D. The system may perform the Amount Short optimization according to:

$$\text{Min: } \sum_{D_{b,l} \in \mathbb{D}} [C(D)]$$

Subject:

$\sum_{k \in \mathbb{K}} \frac{\pi_k}{M_k(D)} X_k(D) + C(D) \ge L(D)$  for each deal $D \in \mathbb{D}$ $\sum_{D_{b,l} \in \mathbb{D}} \{X_k(D)\} <= P_{k,b}$  for each position $k \in \mathbb{K}$ $\sum_{k \in \mathbb{K}, D \in \mathbb{D}_{b,l}}$  for each concentration limit
$\{\pi_k X_k(D) * I(k, D)\} <= V_{b,l}$ $X_k(D) \ge P_k^{(min)*} z, z \in \{0, 1\}$  for $k$ if min par $P_k^{(min)} > 1$ $P_k^{(mm)}(D) \le X_k(D)$  for $D$ if it has UNCOL and is activated.

For example, if there is shortage (or objective value >0) after optimization, the cash penalty $\lambda_{cash}$ will be used as pareto coefficient for cash variables in following step. Otherwise all cash variables will be set to 0.

The system may then minimize the excess processing load (e.g., carry cost) and additional processing load (e.g., transition cost) for reallocations according to the following:

$$\text{Min: } \sum_{D_{b,l} \in \mathbb{D}} \sum_{k \in \mathbb{K}} \left[ \left( \frac{\Gamma_{k,b,l} \pi_k}{M_k(D)} \right) \{X_k(D) + \rho(D) Z_k(D)\} + \lambda_{Cash} C(D) \right]$$

$\sum_{k \in \mathbb{K}} \frac{\pi_k}{M_k(D)} X_k(D) + C(D) \ge L(D)$  for each deal $D \in \mathbb{D}$ $\sum_{D_{b,l} \in \mathbb{D}} X_k(D) \le P_k^{(f)}$  for each position $k \in \mathbb{K}$ $\sum_{k \in \mathbb{K}, D \in \mathbb{D}_{b,l}}$  for each concentration limit
$\{\pi_k X_k(D) * I(k, D)\} <= V_{b,l}$ $X_k(D) \ge P_k^{(min)*} z, z \in \{0, 1\}$  for $k$ if min par $P_k^{(min)} > 1$ $X_k(D) + Z_k(D) \ge P_k^{(mm)}(D)$  for $D$ is no-autocs and $P_k^{(mm)}(D) > 0$ $P_k^{(mm)}(D) \le X_k(D)$  for $D$ if it has UNCOL and is activated $0 \le Z_k(D) \le P_k^{(mm)}(D)$  for $D$ is no-autocs and $P_k^{(mm)}(D) > 0$ For example, in this embodiment, $\rho(D)$ is transition cost coefficient for variable $Z_k(D)$, e.g. 5% if D has no-autocash tag, which may be interpreted as carry cost discount for min-mod allocation.

Notably, the system uses Mixed Integer Programming models which mandates that objective function and all constraints are linear functions, variables are either in integer space (allocation variables cannot be fractional of shares) or in continuous space (cash amount).

Furthermore, the system is NP-complete (meaning there is no polynomial-time algorithm exist), if we just keep the first group of constraints (sum of allocated collateral values and cash for each deal should fully collateralized the deal) and drop all other constraints, the model becomes equivalent to a Knapsack decision problem (which has NP-complete complexity). So our model complexity is at least NP-complete (complexity has 3 categories: P, NP-complete, NP-hard).

For example, the system may handle integer variable sizes from 500 k to 7 mm (Cartesian product between number of deals and number of eligible positions), which are unattainable algorithms such as Branch-and-Bound or Branch-and-Cut algorithms.

Finally, the system uses Column Generation algorithms which solve very large mixed integer programming models (up to 15 mm variables) in very reasonable time (less than 10 minutes in most cases), which allows the system to be run intraday continuously to optimize their collateral usage.

Figure 4:
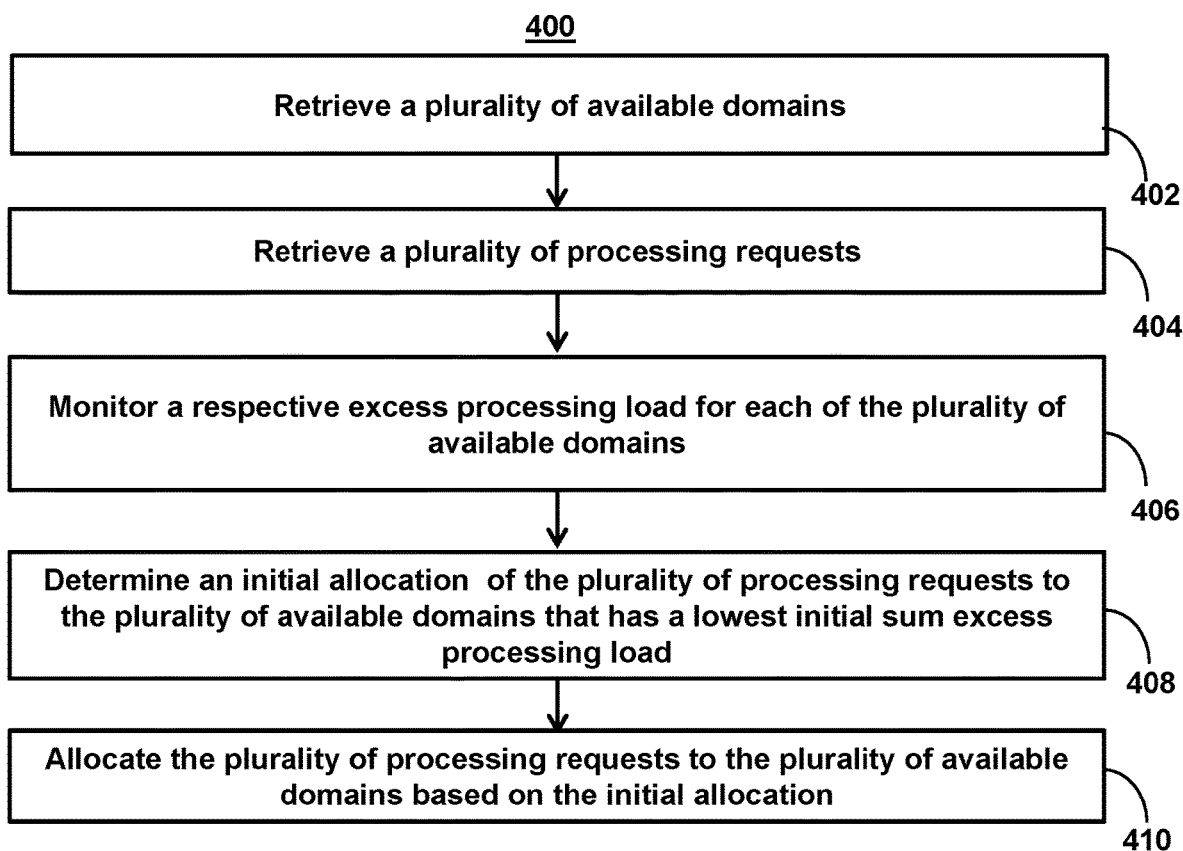
FIG. 4 shows a flowchart of the steps involved in allocating a plurality of processing requests to a plurality of available domains based on an initial allocation, in accordance with one or more embodiments.

FIG. 4 shows a flowchart of the steps involved in allocating a plurality of processing requests to a plurality of available domains based on an initial allocation, in accordance with one or more embodiments. For example, process 400 may represent the steps taken by one or more devices as shown in FIGS. 1-3. In some embodiments, process 400 may represent the steps taken by one or more devices as shown in FIGS. 1-3 of assigning collateral items among deals requiring collateral items with variable deal rule sets and requirements.

At step 402, process 400 retrieves (e.g., using control circuitry of one or more components of system 100 (FIG. 1)) a plurality of available domains. For example, the system may retrieve a plurality of available deals, wherein each deal requires collateralization. In some embodiments, the system may retrieve a plurality of available deals, wherein each deal requires collateralization.

At step 404, process 400 retrieves (e.g., using control circuitry of one or more components of system 100 (FIG. 1)) a plurality of processing requests. For example, the system may retrieve a plurality of processing requests, wherein each respective processing request has an initial estimated processing load.

In some embodiments, the system may retrieve a plurality of collateral items, wherein each respective collateral item has an initial estimated price.

At step 406, process 400 monitors (e.g., using control circuitry of one or more components of system 100 (FIG. 1)) a respective excess processing load for each of the plurality of available domains. For example, the system may monitor a respective excess processing load for each of the plurality of available domains, wherein the respective excess processing load comprises an amount of processing load availability on a domain of the plurality of available domains.

In some embodiments, the system may monitor an actual processing load for each of the plurality of processing requests. The system may then compare the actual processing load for each of the plurality of processing requests to initial processing loads for each respective processing request. The system may then generate the updated estimated processing load in response to detecting a difference between the actual processing load for each of the plurality of processing requests and the initial processing loads for each respective processing request.

In some embodiments, the system may monitor a respective uncollateralized portion for each of the plurality of available deals, wherein the respective uncollateralized portion comprises an amount of shortfall of a price of the collateral on a deal of the plurality of available deals. In some embodiments, the system may monitor a respective cost to carry for each of the plurality of available deals, wherein the respective cost to carry comprises a sum price of collateral items on a deal of the plurality of available deals.

At step 408, process 400 determines (e.g., using control circuitry of one or more components of system 100 (FIG. 1)) an initial allocation of the plurality of processing requests to the plurality of available domains that has a lowest initial sum excess processing load. For example, the system may determine an initial allocation of the plurality of processing requests to the plurality of available domains that has a lowest initial sum excess processing load, wherein the initial allocation comprises assigning each of the plurality of processing requests to a respective available domain of the plurality of available domains based on the initial estimated processing load for each of the plurality of processing requests, and wherein the initial sum excess processing load comprises a summation of the respective excess processing load for each of the plurality of available domains based on the initial estimated processing load for each of the plurality of processing requests.

In some embodiments, the system may determine an initial allocation of the plurality of collateral items to the plurality of available deals that has a lowest initial sum uncollateralized portion, wherein the initial allocation comprises assigning each of the plurality of collateral items to a respective available deal of the plurality of available deals based on the initial estimated price for each of the plurality of collateral items, and wherein the initial sum uncollateralized portion comprises a summation of the respective uncollateralized portion for each of the plurality of available deals based on the initial estimated price for each of the plurality of collateral items. In some embodiments, the system may determine an initial allocation of the plurality of collateral items to the plurality of available deals that has a lowest initial sum cost to carry, wherein the initial allocation comprises assigning each of the plurality of collateral items to a respective available deal of the plurality of available deals based on the initial estimated price for each of the plurality of collateral items, and wherein the initial sum cost to carry comprises a summation of the respective cost to carry for each of the plurality of available deals based on the initial estimated price for each of the plurality of collateral items.

At step 410, process 400 allocates (e.g., using control circuitry of one or more components of system 100 (FIG. 1)) the plurality of processing requests to the plurality of available domains based on the initial allocation. For example, the system may allocate the plurality of processing requests to the plurality of available domains based on the initial allocation.

In some embodiments, the system may allocate the plurality of collateral items to the plurality of available deals based on the initial allocation.

It is contemplated that the steps or descriptions of FIG. 4 may be used with any other embodiment of this disclosure.

In addition, the steps and descriptions described in relation to FIG. 4 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-3 could be used to perform one or more of the steps in FIG. 4.

Figure 5:
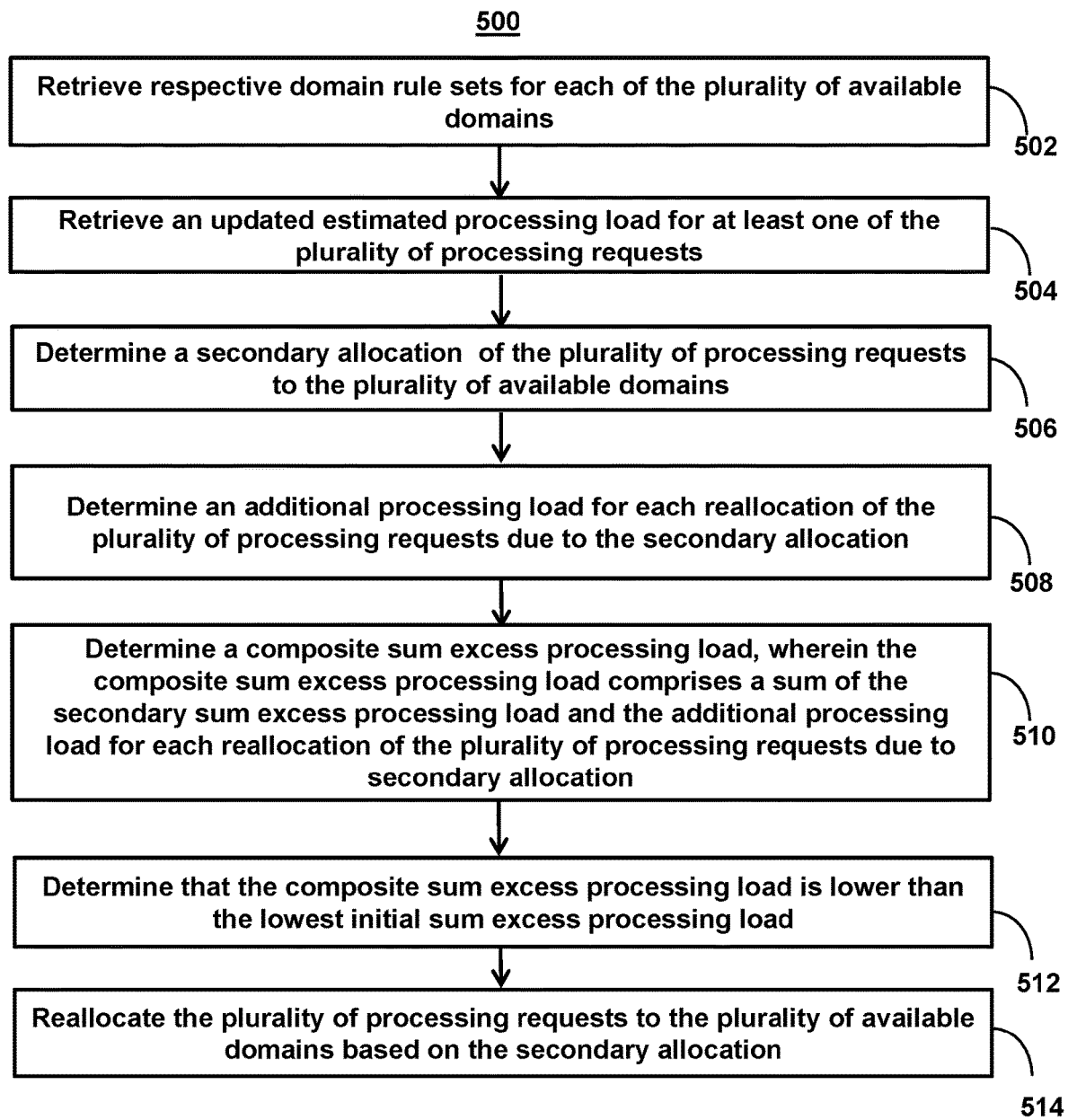
FIG. 5 shows a flowchart of the steps involved in reallocating a plurality of processing requests to a plurality of available domains based on a secondary allocation, in accordance with one or more embodiments.

FIG. 5 shows a flowchart of the steps involved in reallocating a plurality of processing requests to a plurality of available domains based on a secondary allocation, in accordance with one or more embodiments. For example, process 500 may represent the steps taken by one or more devices as shown in FIGS. 1-3.

At step 502, process 500 retrieves (e.g., using control circuitry of one or more components of system 100 (FIG. 1)) respective domain rule sets for each of a plurality of available domains. For example, the system may retrieve the respective domain rule sets for each of the plurality of available domains, wherein a domain rule set for a respective domain requires that the respective domain has no excess processing load prior to a processing request initially allocated to the respective domain being re-allocated to a target domain.

In some embodiments, a domain rule set for a respective domain requires that a reallocation of a processing load previously allocated to the respective domain causes no excess processing load on the respective domain following the reallocation. For example, the domain (e.g., a financial service deal) may be tagged as a no cash repo account such that the system cannot use cash or credit for collateral movements and/or other repo accounts are subject to credit usage limit for position movements.

In some embodiments, a domain rule set for a respective domain requires that the respective domain has no excess processing load prior to a processing request initially allocated to the respective domain being re-allocated to a target domain. For example, the domain (e.g., a financial service deal) may have an UNCOL tag in repo account that mandates that a UNCOL deal is fully collateralized before any collateral can be de-allocated from it. In such cases, assigning each of the plurality of processing requests to the respective available domain of the plurality of available domains based on the updated estimated processing load for each of the plurality of processing requests and the respective domain rule sets for each of the plurality of available domains, comprises minimizing the secondary sum excess processing load while maintaining a subset of the plurality of processing requests initially allocated to the respective domain.

In some embodiments, a domain rule set for a respective domain indicates an additional processing load for any reallocation of a processing request initially allocated to the respective domain. For example, the domain (e.g., a financial service deal) may have collateral registration changes that impose (e.g., in some repo markets such as South Korea), tangible transaction costs for collateral movements. In some embodiments, the system may retrieve respective deal rule sets for each of the plurality of available deals.

At step 504, process 500 retrieves (e.g., using control circuitry of one or more components of system 100 (FIG. 1)) an updated estimated processing load for at least one of the plurality of processing requests. For example, the system may retrieve an updated estimated processing load for at least one of the plurality of processing requests. In some embodiments, the system may retrieve an updated estimated price for at least one of the plurality of collateral items.

At step 506, process 500 determines (e.g., using control circuitry of one or more components of system 100 (FIG. 1)) a secondary allocation of the plurality of processing requests to the plurality of available domains. For example, the system may determine a secondary allocation of the plurality of processing requests to the plurality of available domains, wherein the secondary allocation comprises assigning each of the plurality of processing requests to a respective available domain of the plurality of available domains based on the updated estimated processing load and the respective domain rule sets by minimizing the secondary sum excess processing load while maintaining a subset of the plurality of processing requests initially allocated to the respective domain, and wherein a secondary sum excess processing load comprises a summation of the respective excess processing load for each of the plurality of available domains based on the updated estimated processing load for each of the plurality of processing requests.

In some embodiments, assigning each of the plurality of processing requests to the respective available domain of the plurality of available domains based on the updated estimated processing load for each of the plurality of processing requests and the respective domain rule sets for each of the plurality of available domains, comprises determining a minimal modification solution from the initial allocation while satisfying constraints based on the updated estimated processing load for each of the plurality of processing requests and the respective domain rule sets for each of the plurality of available domains.

In some embodiments, the system may determine a secondary allocation of the plurality of collateral items to the plurality of available deals, wherein the secondary allocation comprises assigning each of the plurality of collateral items to a respective available deal of the plurality of available deals based on the updated estimated price and the respective deal rule sets, and wherein the secondary sum uncollateralized portion comprises a summation of the respective uncollateralized portion for each of the plurality of available deals based on the updated estimated price for each of the plurality of collateral items. In some embodiments, the system may determine a secondary allocation of the plurality of collateral items to the plurality of available deals, wherein the secondary allocation comprises assigning each of the plurality of collateral items to a respective available deal of the plurality of available deals based on the updated estimated price and the respective deal rule sets, and wherein a secondary sum cost to carry comprises a summation of the respective cost to carry for each of the plurality of available deals based on the updated estimated price for each of the plurality of collateral items.

At step 508, process 500 determines (e.g., using control circuitry of one or more components of system 100 (FIG. 1)) an additional processing load for each reallocation of the plurality of processing requests due to the secondary allocation. For example, the system may determine an additional processing load for each reallocation of the plurality of processing requests due to the secondary allocation. In some embodiments, the system may determine a transaction cost for each reallocation of the plurality of collateral items due to the secondary allocation.

At step 510, process 500 determines (e.g., using control circuitry of one or more components of system 100 (FIG. 1)) a composite sum excess processing load, wherein the composite sum excess processing load comprises a sum of the secondary sum excess processing load and the additional processing load for each reallocation of the plurality of processing requests due to secondary allocation. For example, the system may determine a composite sum excess processing load, wherein the composite sum excess processing load comprises a sum of the secondary sum excess processing load and the additional processing load for each reallocation of the plurality of processing requests due to secondary allocation.

In some embodiments, the system may determine the composite sum excess processing load comprises generating a pareto coefficient representing the sum of the secondary sum excess processing load and the additional processing load for each reallocation of the plurality of processing requests due to secondary allocation. For example, if X is a random variable with a Pareto (Type I) distribution, then the probability that X is greater than some number x, i.e. the survival function (also called tail function), is given by $$\overline{F}(x) = Pr(X > x) = \begin{cases} \left(\frac{x_m}{x}\right)^\alpha & x \geq x_m, \\ 1 & x < x_m, \end{cases}$$

where $x_m$ is the (necessarily positive) minimum possible value of X, and $\alpha$ is a positive parameter. The Pareto Type I distribution is characterized by a scale parameter $x_m$ and a shape parameter $\alpha$, which is known as the tail index. When this distribution is used to model the distribution of wealth, then the parameter $\alpha$ is called the Pareto index.

The system may then apply a column generation algorithm to minimize the pareto coefficient. For example, the system may model using Mixed Integer Linear Programming. The advantage of column generation is that not all possibilities need to be enumerated. Instead, the problem is first formulated as a restricted master problem (RMP). This RMP has as few variables as possible, and new variables are brought into the basis as needed, similar to the simplex method. By similar to the simplex method, it means that if a column with a negative reduced cost can be found, it is added to the RMP and this process is repeated until no more columns can be added to the RMP.

In some embodiments, the system may determine a composite sum uncollateralized portion, wherein the composite sum cost to carry comprises a sum of the secondary sum cost to carry and the transaction cost for each reallocation of the plurality of collateral items due to the secondary allocation. In some embodiments, the system may determine a composite sum uncollateralized portion, wherein the composite sum uncollateralized portion comprises a sum of the secondary sum cost to carry and the transaction cost for each reallocation of the plurality of collateral items due to the secondary allocation.

At step 512, process 500 determines (e.g., using control circuitry of one or more components of system 100 (FIG. 1)) that the composite sum excess processing load is lower than the lowest initial sum excess processing load. For example, the system may determine that the composite sum excess processing load is lower than the lowest initial sum excess processing load.

In some embodiments, the system may determine that the composite sum uncollateralized portion is lower than the lowest initial sum uncollateralized portion. In some embodiments, the system may determine that the composite sum cost to carry is lower than the lowest initial sum cost to carry.

At step 514, process 500 reallocates (e.g., using control circuitry of one or more components of system 100 (FIG. 1)) the plurality of processing requests to the plurality of available domains based on the secondary allocation. For example, the system may reallocate the plurality of processing requests to the plurality of available domains based on the secondary allocation in response to determining that a composite sum excess processing load is lower than the lowest initial sum excess processing load. For example, the system may then generate for display, on a display device, a list of the plurality of processing requests according to the secondary allocation.

In some embodiments, the system may, in response to determining that a composite sum uncollateralized portion is lower than the lowest initial sum uncollateralized portion, reallocate the plurality of collateral items to the plurality of available deals based on the secondary allocation. In some embodiments, the system may, in response to determining that a composite sum cost to carry is lower than the lowest initial sum cost to carry, reallocate the plurality of collateral items to the plurality of available deals based on the secondary allocation.

In some embodiments, the system may determine that a secondary composite sum excess processing load is lower than the composite sum excess processing load, wherein the secondary composite sum excess processing load comprises a sum of a third sum excess processing load for a third allocation and a second additional processing load for each reallocation of the plurality of processing requests due to a third allocation. The system may, in response to determining that a secondary composite sum excess processing load is lower than the composite sum excess processing load, reallocate the plurality of processing requests to the plurality of available domains based on the third allocation. For example, the system may iteratively determine composite sum excess processing loads and continuously reallocate the plurality of processing requests.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-3 could be used to perform one or more of the steps in FIG. 5.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method of balancing loads in distributed computer networks for computer processing requests with variable rule sets and dynamic processing loads, the method comprising: retrieving a plurality of available domains; retrieving a plurality of processing requests, wherein each respective processing request has an initial estimated processing load; monitoring a respective excess processing load for each of the plurality of available domains, wherein the respective excess processing load comprises an amount of processing load availability on a domain of the plurality of available domains; determining an initial allocation of the plurality of processing requests to the plurality of available domains that has a lowest initial sum excess processing load, wherein the initial allocation comprises assigning each of the plurality of processing requests to a respective available domain of the plurality of available domains based on the initial estimated processing load for each of the plurality of processing requests, and wherein the initial sum excess processing load comprises a summation of the respective excess processing load for each of the plurality of available domains based on the initial estimated processing load for each of the plurality of processing requests; allocating the plurality of processing requests to the plurality of available domains based on the initial allocation; retrieving respective domain rule sets for each of the plurality of available domains; retrieving an updated estimated processing load for at least one of the plurality of processing requests; determining a secondary allocation of the plurality of processing requests to the plurality of available domains, wherein the secondary allocation comprises assigning each of the plurality of processing requests to a respective available domain of the plurality of available domains based on the updated estimated processing load and the respective domain rule sets, and wherein a secondary sum excess processing load comprises a summation of the respective excess processing load for each of the plurality of available domains based on the updated estimated processing load for each of the plurality of processing requests; determining an additional processing load for each reallocation of the plurality of processing requests due to the secondary allocation; determining a composite sum excess processing load, wherein the composite sum excess processing load comprises a sum of the secondary sum excess processing load and the additional processing load for each reallocation of the plurality of processing requests due to secondary allocation; determining that the composite sum excess processing load is lower than the lowest initial sum excess processing load; and in response to determining that a composite sum excess processing load is lower than the lowest initial sum excess processing load, reallocating the plurality of processing requests to the plurality of available domains based on the secondary allocation.

2. The method of embodiment 1, further comprising: determining that a secondary composite sum excess processing load is lower than the composite sum excess processing load, wherein the secondary composite sum excess processing load comprises a sum of a third sum excess processing load for a third allocation and a second additional processing load for each reallocation of the plurality of processing requests due to third allocation; and in response to determining that a secondary composite sum excess processing load is lower than the composite sum excess processing load, reallocating the plurality of processing requests to the plurality of available domains based on the third allocation.

3. The method of any one of embodiments 1-2, wherein a domain rule set for a respective domain requires that a reallocation of a processing load previously allocated to the respective domain causes no excess processing load on the respective domain following the reallocation.

4. The method of any one of embodiments 1-3, wherein a domain rule set for a respective domain requires that the respective domain has no excess processing load prior to a processing request initially allocated to the respective domain being re-allocated to a target domain.

5. The method of any one of embodiments 4, wherein assigning each of the plurality of processing requests to the respective available domain of the plurality of available domains based on the updated estimated processing load for each of the plurality of processing requests and the respective domain rule sets for each of the plurality of available domains, comprises minimizing the secondary sum excess processing load while maintaining a subset of the plurality of processing requests initially allocated to the respective domain.

6. The method of any one of embodiments 1-5, wherein a domain rule set for a respective domain indicates an additional processing load for any reallocation of a processing request initially allocated to the respective domain.

7. The method of any one of embodiments 1-6, wherein determining the composite sum excess processing load comprises: generating a pareto coefficient representing the sum of the secondary sum excess processing load and the additional processing load for each reallocation of the plurality of processing requests due to secondary allocation; and applying a column generation algorithm to minimize the pareto coefficient.

8. The method of any one of embodiments 1-7, wherein assigning each of the plurality of processing requests to the respective available domain of the plurality of available domains based on the updated estimated processing load for each of the plurality of processing requests and the respective domain rule sets for each of the plurality of available domains, comprises determining a minimal modification solution from the initial allocation while satisfying constraints based on the updated estimated processing load for each of the plurality of processing requests and the respective domain rule sets for each of the plurality of available domains.

9. The method of any one of embodiments 1-8, further comprising: monitoring an actual processing load for each of the plurality of processing requests; comparing the actual processing load for each of the plurality of processing requests to initial processing loads for each respective processing request; and generating the updated estimated processing load in response to detecting a difference between the actual processing load for each of the plurality of processing requests and the initial processing loads for each respective processing request.

10. A method of collateral items among deals requiring collateral items with variable deal rule sets and requirements, the method comprising: retrieving a plurality of available deals, wherein each deal requires collateralization; retrieving a plurality of collateral items, wherein each respective collateral item has an initial estimated price; monitoring a respective uncollateralized portion for each of the plurality of available deals, wherein the respective uncollateralized portion comprises an amount of shortfall of a price of the collateral on a deal of the plurality of available deals; determining an initial allocation of the plurality of collateral items to the plurality of available deals that has a lowest initial sum uncollateralized portion, wherein the initial allocation comprises assigning each of the plurality of collateral items to a respective available deal of the plurality of available deals based on the initial estimated price for each of the plurality of collateral items, and wherein the initial sum uncollateralized portion comprises a summation of the respective uncollateralized portion for each of the plurality of available deals based on the initial estimated price for each of the plurality of collateral items; allocating the plurality of collateral items to the plurality of available deals based on the initial allocation; receiving respective deal rule sets for each of the plurality of available deals; receiving an updated estimated price for at least one of the plurality of collateral items; determining a secondary allocation of the plurality of collateral items to the plurality of available deals, wherein the secondary allocation comprises assigning each of the plurality of collateral items to a respective available deal of the plurality of available deals based on the updated estimated price and the respective deal rule sets, and wherein the secondary sum uncollateralized portion comprises a summation of the respective uncollateralized portion for each of the plurality of available deals based on the updated estimated price for each of the plurality of collateral items; determining a transaction cost for each reallocation of the plurality of collateral items due to the secondary allocation; determining a composite sum uncollateralized portion, wherein the composite sum cost to carry comprises a sum of the secondary sum cost to carry and the transaction cost for each reallocation of the plurality of collateral items due to the secondary allocation; determining that the composite sum uncollateralized portion is lower than the lowest initial sum uncollateralized portion; and in response to determining that a composite sum uncollateralized portion is lower than the lowest initial sum uncollateralized portion, reallocating the plurality of collateral items to the plurality of available deals based on the secondary allocation.

11. A method of collateral items among deals requiring collateral items with variable deal rule sets and requirements, the method comprising: retrieving a plurality of available deals, wherein each deal requires collateralization; retrieving a plurality of collateral items, wherein each respective collateral item has an initial estimated price; monitoring a respective cost to carry for each of the plurality of available deals, wherein the respective cost to carry comprises a sum price of collateral items on a deal of the plurality of available deals; determining an initial allocation of the plurality of collateral items to the plurality of available deals that has a lowest initial sum cost to carry, wherein the initial allocation comprises assigning each of the plurality of collateral items to a respective available deal of the plurality of available deals based on the initial estimated price for each of the plurality of collateral items, and wherein the initial sum cost to carry comprises a summation of the respective cost to carry for each of the plurality of available deals based on the initial estimated price for each of the plurality of collateral items; allocating the plurality of collateral items to the plurality of available deals based on the initial allocation; receiving respective deal rule sets for each of the plurality of available deals; receiving an updated estimated price for at least one of the plurality of collateral items; determining a secondary allocation of the plurality of collateral items to the plurality of available deals, wherein the secondary allocation comprises assigning each of the plurality of collateral items to a respective available deal of the plurality of available deals based on the updated estimated price and the respective deal rule sets, and wherein a secondary sum cost to carry comprises a summation of the respective cost to carry for each of the plurality of available deals based on the updated estimated price for each of the plurality of collateral items; determining a transaction cost for each reallocation of the plurality of collateral items due to the secondary allocation; determining a composite sum uncollateralized portion, wherein the composite sum uncollateralized portion comprises a sum of the secondary sum cost to carry and the transaction cost for each reallocation of the plurality of collateral items due to the secondary allocation; determining that the composite sum cost to carry is lower than the lowest initial sum cost to carry; and in response to determining that a composite sum cost to carry is lower than the lowest initial sum cost to carry, reallocating the plurality of collateral items to the plurality of available deals based on the secondary allocation.

12. A tangible, non-transitory, machine-readable medium storing instructions that, when executed by a data processing apparatus, cause the data processing apparatus to perform operations comprising those of any of embodiments 1-11.

13. A system comprising: one or more processors; and memory storing instructions that, when executed by the processors, cause the processors to effectuate operations comprising those of any of embodiments 1-11.

14. A system comprising means for performing any of embodiments 1-11.

What is claimed is:

1. A non-transitory computer-readable medium storing computer-program instructions that, when executed by one or more processors, cause the one or more processors to effectuate operations comprising:
    obtaining information about electronic designations of one or more collateral items to be allocated to obligations to secure the respective obligations, each electronic designation of a collateral item associated with an allocation value;
    obtaining information about the obligations to secure with one or more of the electronic designations of the collateral items, each obligation associated with an uncollateralized amount of the obligation;
    determining an initial collateral allocation of the electronic designations of the collateral items among the obligations that secures the uncollateralized amounts of the obligations based on respectively allocated electronic designations of collateral items in accordance with their allocation value;
    obtaining collateral allocation constraints;
    obtaining, based on the electronic designations of the collateral items, one or more updates indicative of a change in allocation value of respective ones of the electronic designations of the collateral items;
    reducing, from the initial collateral allocation, at least some excess allocation value among the obligations in a secondary collateral allocation by reallocating, subject to the collateral allocation constraints and the changes in allocation value of the electronic designations of the collateral items, one or more of the electronic designations of the collateral items among the obligations according to an objective function based on both costs of carry of the electronic designations of the collateral items and transition costs of the electronic designations of the collateral items; and
    storing a result of the secondary allocation for securing the obligations.

2. The non-transitory computer-readable medium of claim 1, further comprising:
    monitoring allocation value of a set of electronic designations of collateral items allocated to a given obligation to determine an uncollateralized amount or excess allocation value associated with the given obligation.

3. The non-transitory computer-readable medium of claim 1, further comprising:
    estimating allocation value of one or more of the electronic designations of the collateral items;
    obtaining the one or more updates indicative of the change in allocation value of respective ones of the electronic designations of the collateral items for the one or more of the electronic designations of the collateral items; and
    adjusting the estimated allocation values based on the one or more updates.

4. The non-transitory computer-readable medium of claim 3, wherein:
    an amount of the at least some excess allocation value among the obligations is determined responsive to performing the adjustments to the estimated allocation values.

5. The non-transitory computer-readable medium of claim 1, wherein:
    an excess allocation value is determined for an obligation having an allocated set of electronic designations of collateral items with a sum of their allocation values exceeding a collateral amount of the obligation.

6. The non-transitory computer-readable medium of claim 5, wherein:
    excess allocation values are determined for a plurality of the obligations;
    at least some of the excess allocation values are reduced in the secondary collateral allocation; and
    a sum of the excess allocation values is reduced in the secondary collateral allocation.

7. The non-transitory computer-readable medium of claim 1, wherein:
    an uncollateralized amount of an obligation is an amount of value not secured by a sum of allocation values of a set of electronic designations of collateral items allocated to secure the obligation.

8. The non-transitory computer-readable medium of claim 1, wherein:
    a transition cost is a cost associated with reallocating an electronic designation of a collateral item from an obligation which it secures all or in part with its associated allocation value to a different obligation.

9. The non-transitory computer-readable medium of claim 1, wherein:
    a cost of carry is a cost associated with an amount of allocation value of electronic designations of collateral items allocated to an obligation that exceeds a collateral amount of the obligation.

10. The non-transitory computer-readable medium of claim 9, wherein the at least some excess allocation value among the obligations in the secondary collateral allocation is determined to be reduced based on:
    reducing at least some of the costs of carry;
    reducing a sum of the costs of carry; and
    minimization of a sum of transition costs to effectuate the reallocation of the electronic designations of the collateral items among the obligations to transition the initial collateral allocation to the secondary collateral allocation.

11. A method, comprising:
    obtaining, by a processor, information about electronic designations of one or more collateral items to be allocated to obligations to secure the respective obligations, each electronic designation of a collateral item associated with an allocation value;
    obtaining, by the processor, information about the obligations to secure with one or more of the electronic designations of the collateral items, each obligation associated with an uncollateralized amount of the obligation;
    determining, by the processor, an initial collateral allocation of the electronic designations of the collateral items among the obligations that secures the uncollateralized amounts of the obligations based on respectively allocated electronic designations of collateral items in accordance with their allocation value;

obtaining, by the processor, collateral allocation constraints;

obtaining, by the processor, based on the electronic designations of the collateral items, one or more updates indicative of a change in allocation value of respective ones of the electronic designations of the collateral items;

reducing, by the processor, from the initial collateral allocation, at least some excess allocation value among the obligations in a secondary collateral allocation by reallocating, subject to the collateral allocation constraints and the changes in allocation value of the electronic designations of the collateral items, one or more of the electronic designations of the collateral items among the obligations according to an objective function based on both costs of carry of the electronic designations of the collateral items and transition costs of the electronic designations of the collateral items; and storing, by the processor, a result of the secondary allocation for securing the obligations.

12. The method of claim 11, further comprising:
monitoring, by the processor, allocation value of a set of electronic designations of collateral items allocated to a given obligation to determine an uncollateralized amount or excess allocation value associated with the given obligation.

13. The method of claim 11, further comprising:
estimating, by the processor, allocation value of one or more of the electronic designations of the collateral items;
obtaining, by the processor, the one or more updates indicative of the change in allocation value of respective ones of the electronic designations of the collateral items for the one or more of the electronic designations of the collateral items; and
adjusting, by the processor, the estimated allocation values based on the one or more updates.

14. The method of claim 13, wherein:
an amount of the at least some excess allocation value among the obligations is determined responsive to performing the adjustments to the estimated allocation values.

15. The method of claim 11, wherein:
an excess allocation value is determined for an obligation having an allocated set of electronic designations of collateral items with a sum of their allocation values exceeding a collateral amount of the obligation.

16. The method of claim 15, wherein:
excess allocation values are determined for a plurality of the obligations;
at least some of the excess allocation values are reduced in the secondary collateral allocation; and
a sum of the excess allocation values is reduced in the secondary collateral allocation.

17. The method of claim 11, wherein:
an uncollateralized amount of an obligation is an amount of value not secured by a sum of allocation values of a set of electronic designations of collateral items allocated to secure the obligation.

18. The method of claim 11, wherein:
a transition cost is a cost associated with reallocating an electronic designation of a collateral item from an obligation which it secures all or in part with its associated allocation value to a different obligation.

19. The method of claim 11, wherein:
a cost of carry is a cost associated with an amount of allocation value of electronic designations of collateral items allocated to an obligation that exceeds a collateral amount of the obligation.

20. The method of claim 19, wherein the at least some excess allocation value among the obligations in the secondary collateral allocation is determined to be reduced based on:
reducing at least some of the costs of carry;
reducing a sum of the costs of carry; and
minimization of a sum of transition costs to effectuate the reallocation of the electronic designations of the collateral items among the obligations to transition the initial collateral allocation to the secondary collateral allocation.

* * * * *